(No Model.) 3 Sheets—Sheet 2.
H. ALBERT.
ELEVATOR.
No. 360,504. Patented Apr. 5, 1887.
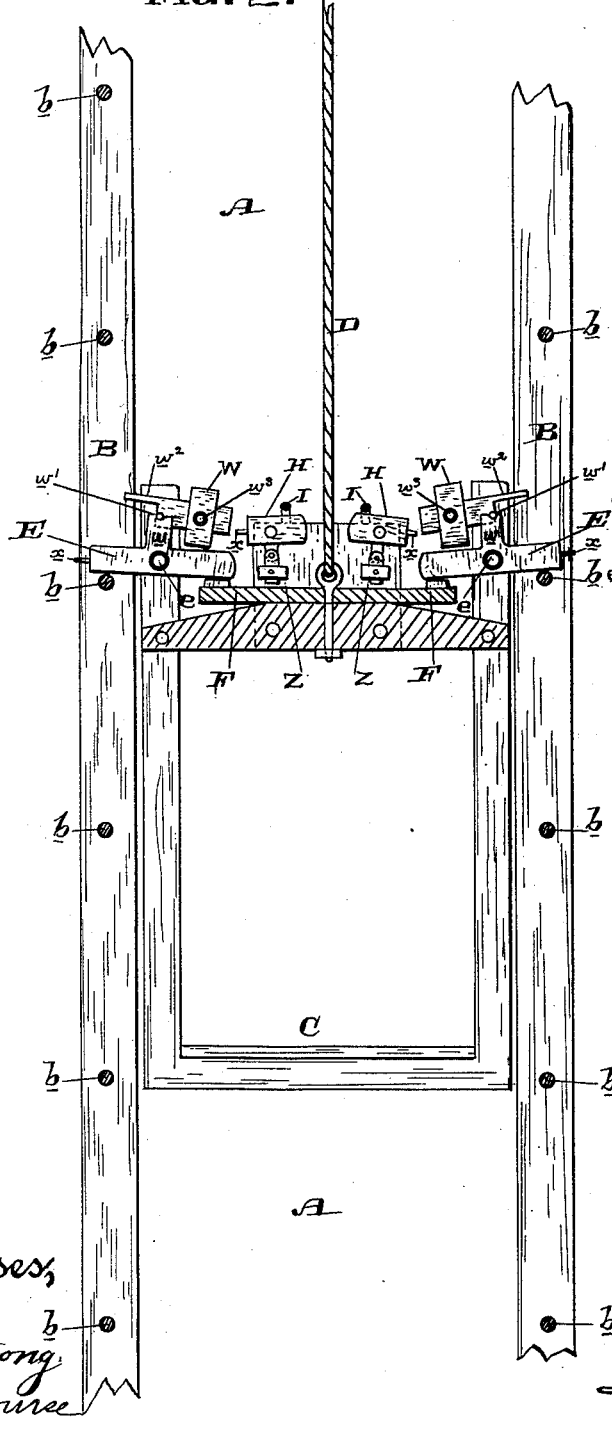
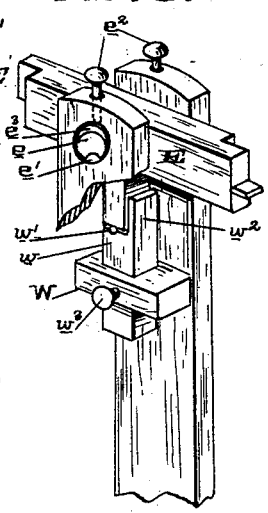
Witnesses:
Geo. H. Strong
J. H. Rouse
Inventor,
H. Albert
By Dewey & Co.
attys (No Model.) 3 Sheets—Sheet 3.
H. ALBERT.
ELEVATOR.
No. 360,504. Patented Apr. 5, 1887.
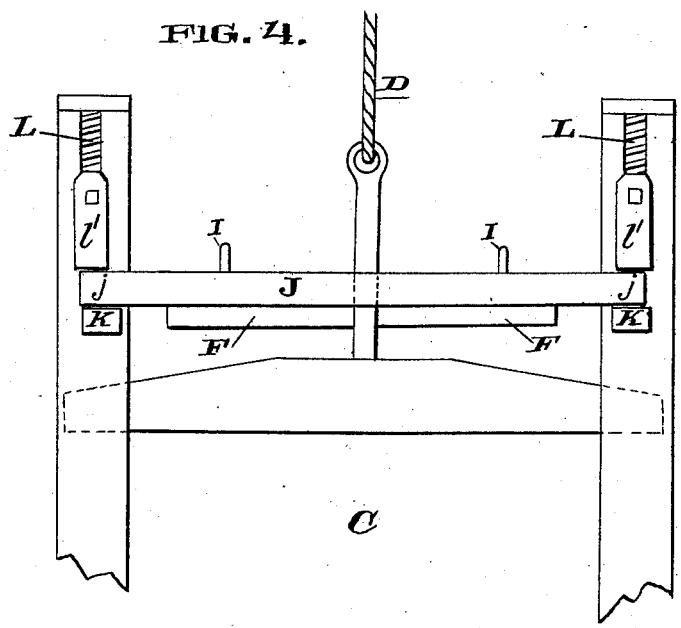
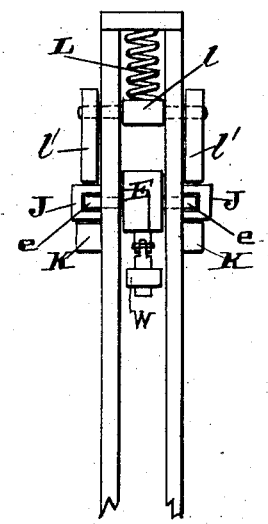
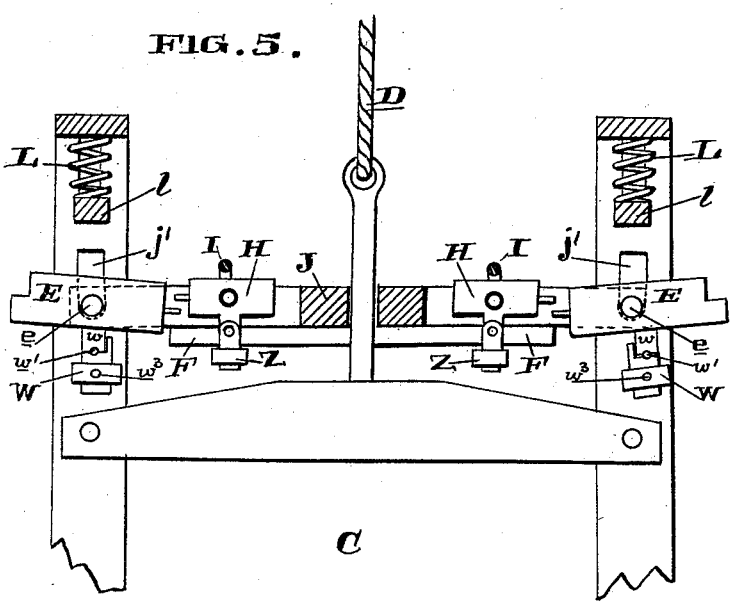
Witnesses,
Geo. H. Strong.
J. H. Trusse.
Inventor,
H. Albert
By Dewey & Co.
attys

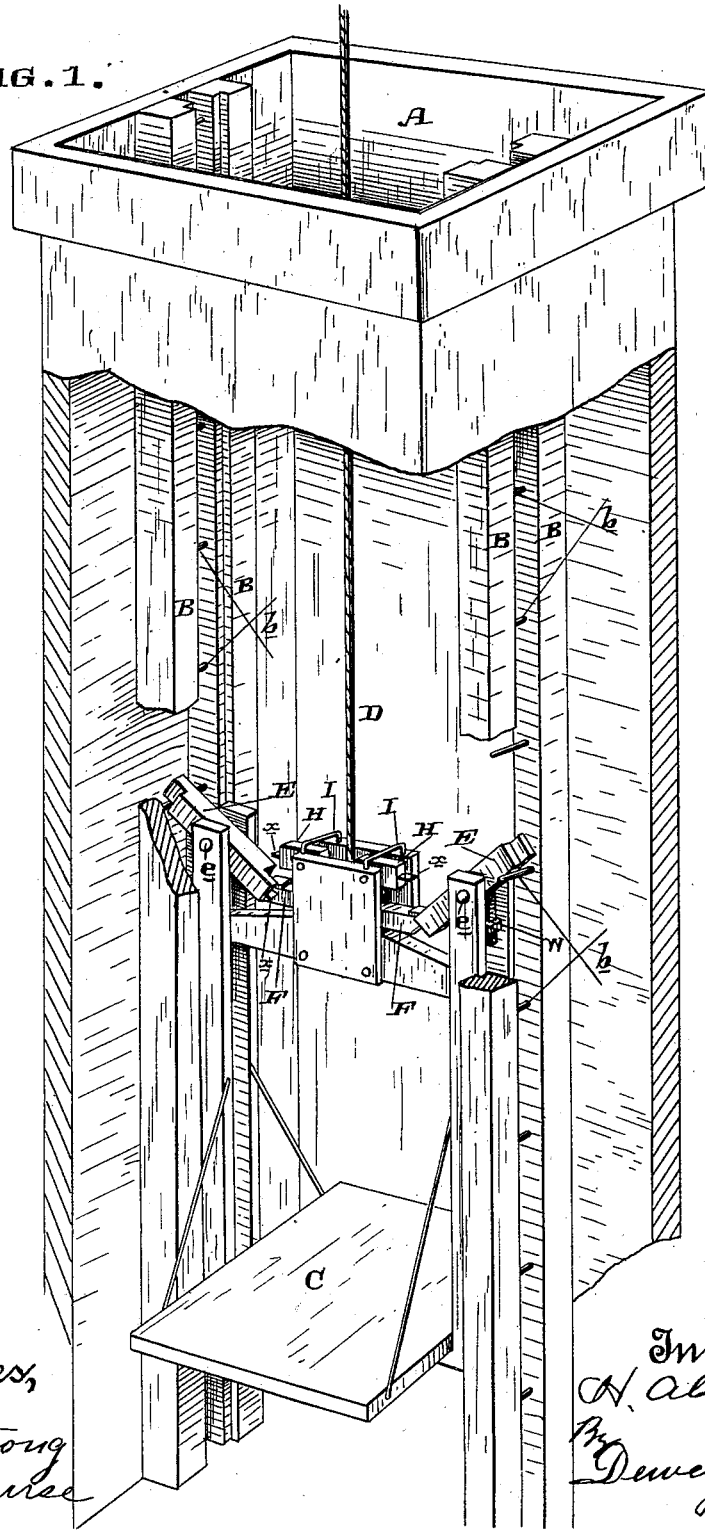

UNITED STATES PATENT OFFICE.

HENRY ALBERT, OF CRESCENT CITY, CALIFORNIA.

ELEVATOR.

SPECIFICATION forming part of Letters Patent No. 360,504, dated April 5, 1887.

Application filed December 31, 1886. Serial No. 223,155. (No model.)

*To all whom it may concern:*

Be it known that I, HENRY ALBERT, of Crescent City, county of Del Norte, and State of California, have invented an Improvement in Elevators; and I hereby declare the following to be a full, clear, and exact description thereof.

My invention relates to the class of elevators used in buildings for the handling of freight and the moving of passengers up and down; and my invention consists in the hereinafter-described safety appliance or attachment to the car or cage, whereby, in case the hoisting-rope breaks, or by any other accident the cage or car attains or is likely to attain an undue speed, it may be checked and caught, to prevent a serious accident.

This safety appliance, which I shall describe fully during the course of the specification, may, in order to show its nature, be briefly described as follows: In each side of the top of the cage or car is pivoted a weighted balanced catch, the outer end of which comes in contact with, and, under ordinary speed, slips by, the successive bars or stops of the rack in the elevator well or shaft. When the cage or car attains an undue speed in its descent this contact of the catches becomes so severe as to throw them beyond their centers of gravity, causing them to make a complete half-turn, in which position their reversed ends, the one resting on the rack-bar or stop and the other on a fixed stop on the cage or car, effectually arrest the descent of said cage or car. In connection with these balanced swinging catches there are several other features, such as the adjustable connection of the balance-weights with the catches, whereby their proper operation is rendered more effective and certain and the speed of the cage or car regulated, the pivoted balanced stops for checking the vibration of the catches when operating normally, the fixed stops for holding the catches when thrown to position to stop the cage or car, and other details of construction. There is also a further feature—namely, the sliding spring-controlled or cushioned cross head or bar—by which the reversible catches, the fixed stops, and the balanced stops are carried, whereby the jar occasioned by the sudden arrest of the cage or car is wholly obviated and relieved.

The object of my invention is to provide an automatic safety appliance for elevators, which, while being of the most simple character, is at the same time effective in its operation.

Referring to the accompanying drawings, Figure 1 is a perspective view of the cage or car in the shaft or well, portions of the latter being broken away to show the former. In this figure the catches E are represented as operating normally during the descent of the cage or car. Fig. 2 is a side elevation of the working parts, the catches being thrown over and holding the cage or car suspended. Fig. 3 is a detail perspective of one of the catches. Figs. 4, 5, 6 show the operative parts carried by the cushioned cross-head J.

A is the shaft or well, in the sides of which are made the racks B, here shown as consisting of grooved guides, having at intervals the transverse bars $b$. These racks may, however, be made in other ways, and need not necessarily consist of the transverse bars, as blocks or other stops firmly secured to the walls of the shaft, and with which the catches engage, may be employed.

C is the cage or car, mounted in the shaft or well, and adapted to be raised and lowered by means of suitable hoisting or elevating machinery or device, such as the suspending rope or cable D, secured to its top.

E are the catches. These consist of stout bars pivoted at $e$ in the tops of the side timbers of the frame of the cage or car. Their outer ends project into the guides in the well or shaft A and into the vertical plane of the rack-bars $b$, so that they come in contact successively with said bars, but being pivoted they slip by them and by vibration return to an equilibrium.

Upon the top of the cage or car are the fixed stops F. The inner ends of the catches do not come in contact with these stops, but their outer ends do when the catches are thrown back through a half-turn, and thus the catches are held in a fixed or rigid position.

The operation thus far will be readily understood. When the cage or car is ascending or descending at a safe rate of speed the ends of the catches slip by the rack-bars and present no obstruction; but in descending, when for any reason too high speed is attained, the catches, by their forcible contact with the rack-bars, are thrown back through a half-turn until their reversed ends rest on the fixed stops F and on one of the rack-bars $b$, whereby the cage or car is stopped. Now, in order to insure the catches remaining in proper position when the cage is running normally, so that they may be ready for operation, I balance them by means of weights W. These cause the catches to come to an equilibrium in a horizontal position, so that their outer ends project within the vertical plane of the rack-bars and are affected by them. Though, as far as this result is concerned, the weights may be secured to the catches in any manner to effect the object, there are additional objects in view which require a peculiar connection.

It will be seen that the weight is suspended from the catch by a jointed arm, $w$, the joint $w'$ of which is so made with a stop, $w^2$, or in any other manner, that while the joint may operate freely in one direction it cannot move at all in the other. The stop $w^2$, which in this case effects this result, is on the inner side of the arm $w$—that is to say, on the side nearer to the fixed stops F. Now, when the outer end of the catch is depressed the joint gives, so that the weight remains plumb; but when the outer end of the catch is elevated the joint does not give, so that the arm $w$ remains rigid and causes the weight to describe an arc of a circle about the pivotal center of the catch until by the half-turn of the catch it passes the perpendicular above, when the joint yields and the weight drops over inwardly upon the catch.

The object of this construction and operation is this: When the cage or car is ascending it is desirable that the catches in coming in contact with the successive bars of the racks shall present as little obstruction as possible. The yielding of the jointed arm of the weight, which takes place during the ascent of the cage or car by the depression of the outer end of the catch, as I have explained, relieves the catch of much of the weight and makes its vibration easy, so that it slips by the rack-bars without trouble. Now, in descending, it is desirable that the vibration of the catch shall not be too easy, as in that case it might be thrown over to its action by a speed which though above the normal might still be safe. The non-yielding of the jointed weight-arm upon the elevation of the outer end of the catch, caused in the descent of the cage or car, provides for this by throwing the whole weight on the catch and making its vibration more difficult; but when the catch is thrown over to its action the yielding of the jointed arm when past the perpendicular throws the weight beyond the center and upon the then inner end of the catch, thus insuring the action of the catch and preventing any rebounding tendency. Now, in order to vary the degree of these objects or results and to define accurately the limits of safety speed, I make the weight vertically adjustable on its arm in some suitable manner—as by fitting it over the lower portion of the arm, so that it may move up and down thereon, and fixing it in the desired position by means of a set-screw, $w^3$. This adjustment provides for regulating the safety speed of the cage or car by making the catch easier or harder to operate.

In the top of the cage or car are pivoted the blocks H. The adjacent ends of these blocks and the catches come lightly in contact; and that this contact may be as light as possible, presenting no more obstruction than is essential for the object in view, small lugs $x$ are secured in the ends of both catches and blocks. The object of these blocks is to quickly arrest the vibration of the catches when operating normally. The catches, pivoted and weighted as they are, after slipping by one of the rack-bars, have such a tendency to continued vibration that they might pass the next rack-bar without touching it. Therefore, it might happen that when needed for immediate action one or both might miss connection; but the contact with the pivoted blocks H at once arrests their vibration and thus insures their contact with each bar.

In order to render the blocks H perfectly effective, I balance them by suspended weights Z, which hold them in proper position of constant action. These weights may, if desired, be made vertically adjustable in a manner similar to the weights W, and the arms upon which they are carried may be rigid; but preferably they should be jointed, so that they may yield in either direction, thereby tending to stop the vibration of the blocks sooner.

I are guards to prevent undue motion and loss of position of the blocks H.

The blocks H present no obstruction to the full operation of the catches. The catches have to pass them but once each trip of the cage or car, and this they do after coming in contact with the first rack-bar met with, after which they are on the proper side for unimpeded vibration. In descending they are also on the proper side for immediate action; but should an accident occur while ascending, it will not require much force to pass the blocks.

If it should be found that the weights W of the catches are not of themselves sufficient when they drop over on the inner ends of the reversed catches, when thrown to action, to prevent their rebound and hold them in position, I may use a positive lock, such as I have shown in Fig. 3.

The pivot-pin $e$ of the catch is provided with a notch or socket, $e'$, which, when the catch is thrown over, comes on top and receives the vertically-arranged gravity pins or bolts $e^2$, mounted in the standards of the cage or car. These effectually lock the catches. These may be used either separately or in connection with the weights.

In order to prevent the pins or bolts $e^2$ from ever getting fast by rust or otherwise, so that they will not operate easily and certainly, I make the pivot-pin $e$ of the catch with a short cam, $e^3$, on its upper part. Upon this the pins rest, and are constantly moved up and down by the oscillation of the pivot-pin. The two pins $e^2$ on one side may be united by a rod or link, if desired. The constant movement of the catches, while the cage is traveling up or down, keeps them always in order, and there is no liability of their getting fast with rust. The slight noise of their contact with the rack-bars informs the operator that everything is in order and that the catches are working. The noise could, however, be obviated, if desired, by the use of rubber on the contact-surfaces.

The racks B may serve for fire-escapes from above. When the catches have once been thrown into action, all that is necessary to return them to working position is to raise the cage or car until the next rack-bar is reached, whereby the catches in coming in contact with it will be turned back again.

Now, by reference to Figs. 4, 5, 6, it will be seen that I have also provided for relieving the cage or car of that jar or shock to which it would be subjected were the catches pivoted directly in its rigid frame-timbers, as I have shown them in the previous figures. For freight-elevators this jar would not be much of a detriment; but for passenger-elevators it would be necessary to relieve it. Accordingly, to accomplish this, I fit a cross head or bar, J, between the frame-timbers of the cage or car, with its ends $j$ overlapping them on each side. This cross-head is adapted to slide up and down. When at rest it is supported on the fixed blocks K.

Within the upper ends of the frame-timbers of the cage or car are springs L, or other elastic cushions, at the lower ends of which are blocks $l$, the ends of which project loosely through vertical slots in the sides of the frame-timbers, whereby they are guided. To these ends of the blocks $l$ are secured the bearing-strips $l'$, which may or may not be secured to the overlapping ends of the cross-head J; but they are held down against said ends by the springs L. It will be seen that this cross-head J carries the reversible catches E, which have their pivot pins or journals $e$ projecting through vertical guide-slots $j'$, in the frame-timbers of the cage or car, and pivoted or mounted in the overlapping ends of the cross-head. The catches therefore move up and down with the cross-head. This cross-head also carries the fixed stops F and the vibrating stop-blocks H. The effect of this construction is as follows: When the cage attains undue speed, and the catches E are reversed end for end, as before described, their inner ends resting on the fixed stops and their outer ends on the bars of the racks, the cross-head J, carrying the catches, gives, and, pressing against the bearing-strips $l'$, is arrested gradually by the springs or elastic cushions, thus arresting the cage or car without jar.

Having thus described my invention, what I claim as new, and desire to secure by Letters Patent, is—

1. In an elevator, and in combination with the cage or car and the rack-bars or stops in the shaft or well, the reversible catches E, pivoted in said cage or car with their outer ends extending within the plane of the rack-bars or stops and adapted to come into contact therewith, said catches having their reversed ends resting on the rack-bars or stops and on the cage or car, whereby the latter is suspended, substantially as and for the purpose specified.

2. In an elevator, and in combination with the cage or car, the rack-bars or stops in the shaft or well, the reversible catches pivoted in the cage or car, their outer ends extending within the plane of the rack-bars or stops and adapted to come into contact therewith, and the fixed stops on the cage or car on which the catches rest when reversed, whereby the cage or car is suspended, substantially as described.

3. In an elevator, and in combination with the cage or car and the rack-bars or stops in the shaft or well, the pivoted reversible catches on the cage or car adapted to come into contact with the rack bars or stops, whereby they are reversed when an undue speed is attained, the fixed stops on the cage or car upon which the reversed catches bear, and weights carried by the catches for preserving their equilibrium when operating normally, substantially as described.

4. In an elevator, the cage or car and the reversible catches pivoted to said cage or car and operating, as described, to stop its too rapid descent, in combination with the weights and the jointed arm suspending them from the catches, said joint yielding in but one direction, substantially as herein described.

5. In an elevator, and in combination with the cage or car and the rack-bars or stops in the shaft or well, the pivoted reversible catches on the cage or car adapted to come into contact with the rack-bars or stops, whereby they are reversed when an undue speed is attained, the fixed stops on the cage or car upon which the reversed catches bear, the weights, and the jointed arms suspending said weights from the catches, the joint yielding but in one direction, substantially as described.

6. In an elevator, the cage or car and the reversible catches pivoted to the cage or car and operating, as described, to stop its too rapid descent, in combination with the jointed arms secured under the catches, their joint yielding but in one direction, and the vertically-adjustable weights fitted to the arms, whereby the safety speed of the cage or car can be regulated, substantially as described.

7. In an elevator, and in combination with the cage or car and the rack-bars or stops in the shaft or well, the pivoted reversible catches on the cage or car adapted to come into contact with the rack-bars or stops, whereby they are reversed when an undue speed is attained, the fixed stops on the cage or car upon which the reversed catches bear, the jointed arms secured under the catches, their joint yielding but in one direction, and the vertically-adjustable weights fitted to the arms, whereby the safety speed of the cage or car can be regulated, substantially as described.

8. In an elevator, the cage or car and the reversible catches pivoted to the cage or car and operating, as described, to stop its too rapid descent, in combination with the pivoted blocks with which the inner ends of the catches are adapted to come into contact, whereby their vibration is checked, substantially as and for the purpose herein described.

9. In an elevator, the cage or car and the reversible catches pivoted to the cage or car and operating, as described, to stop its too rapid descent, in combination with the pivoted blocks with which the inner ends of the catches are adapted to come into contact, whereby their vibration is checked and the weights suspended from said blocks, substantially as described.

10. In an elevator, and in combination with the cage or car, the rack-bars or stops in the shaft or well, the pivoted weighted reversible catches on the cage or car adapted to come into contact with the rack-bars or stops, whereby they are reversed when an undue speed is attained, the fixed stops on the cage or car upon which the reversed catches bear, and the pivoted weighted blocks with which the catches are adapted to come into contact, whereby their vibration is checked, substantially as described.

11. In an elevator, the pivoted reversible catches on the cage or car operating, as described, to stop its too rapid descent, in combination with the means for locking said catches when reversed, consisting of the groove or notch in the pivot-pin of the catches and the gravity pins or bolts for engaging said groove or notch, substantially as described.

12. In an elevator, the pivoted reversible catches on the cage or car operating, as described, to stop its too rapid descent, in combination with the means for locking said catches when reversed, consisting of the groove or notch in the pivot-pin of the catches and the gravity pins or bolts for engaging said groove or notch, and the cam on the upper portion of the pivot-pin of the catch on which the gravity pins or bolts rest, whereby they are given a constant vertical movement, substantially as described.

13. In an elevator, the sliding cross head or bar mounted on the cage or car and springs or cushions against which it acts, in combination with the pivoted reversible catches E, carried by the cross-head and operating to arrest the descent of the cage or car, substantially as described.

14. In an elevator, and in combination with the rack bars or stops in the shaft or well, the sliding cross head or bar mounted on the cage or car and springs or cushions against which it acts and the reversible catches E, pivoted in and carried by the cross head or bar, their outer ends extending within the plane of the rack-bars or stops and adapted to come into contact therewith, whereby upon attaining undue speed they are thrown half-way around, so that their reversed ends rest on the rack-bars or stops and on the cross head or bar, substantially as herein described.

15. In an elevator, the sliding cushioned cross head or bar J, mounted on the cage or car and having the fixed stops F, in combination with the pivoted reversible catches E, carried by the cross head or bar, and operating to arrest the descent of the cage or car, substantially as described.

16. In an elevator, the sliding cushioned cross head or bar J, mounted on the cage or car and having the fixed stops F, in combination with the pivoted reversible catches E, carried by the cross head or bar and operating to arrest the descent of the cage or car, and the pivoted blocks H, carried by said cross head or bar and operating to stop the vibration of the catches, substantially as described.

17. In an elevator, the cage or car having the blocks K on its frame-timbers, the sliding cross head or bar J, resting on said blocks, and the springs or cushions L, having blocks $l$, with bearing-strips $l'$, acting on the cross-bar J, in combination with the pivoted reversible catches E, stops F, and pivoted blocks H, all carried by the cross head or bar, substantially as and for the purpose herein described.

In witness whereof I have hereunto set my hand.

HENRY ALBERT.

Witnesses:
C. D. COLE,
J. H. BLOOD.